(12) United States Patent
Brandstatter

(10) Patent No.: US 9,307,049 B2
(45) Date of Patent: Apr. 5, 2016

(54) VOICE-OVER-IP-(VOIP-) TELEPHONY COMPUTER SYSTEM

(75) Inventor: Klaus Brandstatter, Rosstal (DE)

(73) Assignee: HOB GMBH & CO. KG, Cadolzburg (DE)

( * ) Notice: Subject to any disclaimer, the term of this patent is extended or adjusted under 35 U.S.C. 154(b) by 1905 days.

(21) Appl. No.: 12/039,482

(22) Filed: Feb. 28, 2008

(65) Prior Publication Data

US 2009/0219920 A1 Sep. 3, 2009

(51) Int. Cl.
*H04L 29/08* (2006.01)
*H04L 29/06* (2006.01)

(52) U.S. Cl.
CPC ............ *H04L 67/34* (2013.01); *H04L 65/1059* (2013.01); *H04L 65/1069* (2013.01); *H04L 65/608* (2013.01); *H04L 63/029* (2013.01)

(58) Field of Classification Search
CPC .............. H04L 63/029; H04L 65/1059; H04L 65/1069; H04L 65/608; H04L 67/34
USPC ........................... 370/352, 389; 709/227, 229
See application file for complete search history.

(56) References Cited

U.S. PATENT DOCUMENTS

| 7,366,188 | B2 * | 4/2008 | Kim ................... H04L 12/4633 370/401 |
| 2001/0038624 | A1 * | 11/2001 | Greenberg et al. ........... 370/352 |
| 2003/0140121 | A1 * | 7/2003 | Adams ........................... 709/219 |
| 2004/0148395 | A1 * | 7/2004 | Schulzrinne .................. 709/227 |
| 2007/0150946 | A1 * | 6/2007 | Hanberger .......... H04L 63/0272 726/15 |
| 2008/0162286 | A1 * | 7/2008 | Lieberman et al. ............. 705/14 |
| 2008/0294768 | A1 * | 11/2008 | Sampson ................ H04L 67/22 709/224 |
| 2009/0011743 | A1 * | 1/2009 | Johanson .......... H04M 3/42068 455/414.1 |

FOREIGN PATENT DOCUMENTS

WO 2006010193 A1 2/2006

* cited by examiner

*Primary Examiner* — Khaled Kassim
(74) *Attorney, Agent, or Firm* — Browdy and Neimark, PLLC

(57) ABSTRACT

A Voice-over-IP-(VoIP-) telephony computer system includes a client computer (1) with a web browser (20) installed and which is connectable to a network (4) with access to the public Internet (6), a web server (101) which can be reached over the public Internet (6) from said client computer (1), a gateway computer (102) which can be reached over the public Internet (6) from said client computer (1), a VoIP private branch exchange (PBX) device (9) which can be reached from said gateway computer (102), wherein the VoIP telephone computer system is adapted to run following steps of establishing and maintaining a VoIP telephone connection between the client computer (1) on the one hand and the gateway computer (102) and the VoIP PBX device (9) on the other hand:
  the client computer (1), using the web browser (20), downloads an applet type application (30), which is adapted to establish a VoIP telephone connection from said web server (101),
  said downloaded applet type application (30) establishes a tunnel connection (50) to said gateway computer (102) and installs a SIP telephony client (40) on said client computer (1), and
  all VoIP telephone connection related data between the client computer (1) and the gateway computer (102) and vice versa are transferred using the tunnel connection (50).

10 Claims, 5 Drawing Sheets

VOICE-OVER-IP-(VOIP-) TELEPHONY COMPUTER SYSTEM

BACKGROUND OF THE INVENTION

1. Field of the Invention

The invention refers to a voice-over-IP (VoIP) telephone computer system which provides for telephone communication over data networks like the public Internet.

2. Background Art

Voice communication over data networks is a more and more growing kind of communication. In the past there have been separated communication infrastructures for data networking and voice communications. Currently "Unified Communication" is a slogan, which states that both types of communication are growing together and a common packet based infrastructure will be used to transport both data packets and voice packets. Since TCP/IP is the protocol family that is used for transport of voice data over said common infrastructure, the method of sending voice packets over data networks is called "Voice-over-IP" (VoIP). Due to the low prices of broadband Internet access VoIP is a more and more popular alternative and addendum to the traditional "Public Switched Telephone Network" (PSTN).

There are several alternatives to use phone hardware in connection with VoIP. One of the possible solutions would be to use specific VoIP phones with integrated network interface cards (NICs) that can directly be attached to data networks e.g. Ethernet networks. Another alternative would be to use so called VoIP-adapters to connect traditional phone hardware to data networks. One of the simplest and in many cases cheapest solution is called PC-based VoIP, i.e. the usage of existing computer hardware in connection with a headset that may be plugged to the computer using the USB interface or a sound card, which is an integral or accessory part of the computer. To complete the necessary components for PC-based telephony an additional VoIP-Software must be installed at the computer. This construct is called a "softphone".

For a better understanding of the invention first of all an example for a prior art VoIP telephony computer system is explained in the following before turning to the invention by reference to the first two drawing figures. FIG. 1 illustrates the major functional components of a PC-based VoIP telephony computer system. A client computer 1 is equipped with an I/O-audio device 2, which may be for instance a headset, and a special telephony software client 3, which provides for establishing phone calls from said client computer 1. The latter is connected to a remote network 4, which in turn is connected to the public Internet 6 via a firewall 5. In a similar way a VoIP private branch exchange (PBX) device 9 has a connection to the public Internet 6 via a second firewall 7. The VoIP-PBX device 9, which is responsible for managing phone users/clients and for establishing phone calls, may be connected to a traditional PSTN-PBX device 10, which provides connections to the traditional Public Switched Telephone Network (PSTN) 11. Such a combination allows for establishing phone calls from the client-computer 1 to different destinations, for instance:

to VoIP phones or computer based phones 12a in a corporate network,
to VoIP phones or computer based phones 12b in the public Internet 6 or
to traditional phones 12c in the PSTN.

In this scenario the VoIP PBX device 9 plays a key role. Before two phone endpoints are able to communicate directly there has to be a connection establishment via the VoIP-PBX device 9. For the dial up procedure specific protocols like H.323 or SIP (Session Initiating Protocol) are used. The SIP protocol will be explained in more detail in a later section of the prior art description.

Another technical term which has to be explained in connection with the present invention is the so-called "Click-to-Call" function. Click-to-Call (CtC) refers to the process of starting a telephone call by clicking a button on a web-page. CtC is divided in two general styles. The first style is callback, where the user enters his phone number and an automatism ensures that the user will be called back immediately. As this method has no specific relevance for the current invention it will not be discussed here in detail.

The second style uses the computer to complete the call typically by PC-based VoIP telephony as mentioned above. This means a softphone has to be installed at the user's computer. If such a softphone is not yet installed it must be downloaded for example from the web server from which the CtC process was initiated.

Today most WEB-clients comprise a WEB-browser with an integrated Java virtual machine. Using such a Web-browser it is possible to download and execute applet type applications like a Java® applet. A Java® applet is a software program, usually written in the Java® programming language, which can be executed by Web-browsers for many operating system platforms, including MS Windows®, UNIX®, Mac OS® and Linux® in the environment of a Java® virtual machine. Alternatively ActiveX®-controls as applet type applications can be used for some functionality that is not included in the Web-browser. ActiveX® is a Microsoft® technology and denotes reusable software components that can run in some WEB-browsers, for instance Microsoft's "Internet Explorer®".

Using technologies like Java® applets or ActiveX®-controls it is possible to run web-based applications on a computer without the necessity to manually install specific client software. In the field of Internet telephony (VoIP) this means the downloaded telephony client can run in a web-based environment and the user does not need to have administrator rights. This solution is known as "webphone".

Although many other signalling protocols for Voice-over-IP exist currently primarily the SIP protocol is used for signalling. SIP, the Session Initiation Protocol, is defined by the Internet Engineering Task Force (IETF) in the document RFC 3261. SIP is a signalling protocol that can be used to create two-party, multiparty or multicast sessions, for example (Internet) telephone calls, multimedia distribution and multimedia conferences. SIP clients use the transport protocols TCP or UDP (typically on port 5060) to connect to SIP servers or other SIP end points. SIP is used in setting up and terminating voice or video calls.

FIG. 2 illustrates a typical SIP-based connection establishment of a VoIP phone call. In a first step a telephone #1 that initiates a phone call sends an INVITE message to the SIP proxy server, which in most cases is a functional component of a VoIP PBX device 9 to which it is assigned. This SIP proxy server forwards this INVITE message to telephone #2. In case of telephone #2 is not assigned to the same SIP proxy servers as telephone #1 the SIP proxy server has to forward the INVITE message to another SIP proxy server to which telephone #2 is assigned.

In next step b telephone #2 answers to said INVITE message with a RINGING message. Again this message has to pass the SIP proxy server as well as a message named "OK" which is transmitted from telephone #2 to telephone #1 in a third step c.

In a fourth step d an acknowledgment message (ACK) is sent from telephone #1 to telephone #2. This time the message is sent directly from the initiator to the responder without crossing the VoIP-PBX device 9. In the following steps, namely step e—exchange of audio data—, step f—BYE message for terminating the connection—and step g—OK message to accept the previous BYE message—data are exchanged directly between the both phone partners without interaction of the VoIP-PBX device 9.

It is important to note that during step a (INVITE) a protocol named SDP—"Session Description Protocol"—is used to exchange certain parameters, amongst others the IP-addresses of the participating phone partners.

When SIP-based VoIP is used three types of data have to be exchanged:
SIP, the "Session Initiation Protocol" including SDP, the "Session Description Protocol" (see RFC 4566)
RTP, the "Real-time Transport Protocol" (see RFC 3550), usually UDP and
RTCP, the "Real-time Control Protocol" (see RFC 3550), usually UDP.

Instead of RTP, SRTP can also be used. SRTP is the Secure Real-time Transport Protocol (see RFC 3711).

These protocols are well known for persons skilled in the art for years, but unfortunately they cannot be used everywhere via the public Internet. Today most of the private data networks but also many of public networks worldwide are connected to the public Internet through a firewall. In the majority of cases these firewalls block all traffic from the internal networks to the public Internet, with the exception of outgoing connections for some specific protocols like HTTP ("Hypertext Transport Protocol"—TCP port 80) and HTTPS ("Hypertext Transport Protocol Secure"—TCP port 443). HTTP and HTTPS are not blocked since these protocols are usually used for "browsing" the Internet. The security policies of most companies allow using said protocols to communicate with destinations in the public Internet.

Since the protocols, which are commonly used for VoIP telephony, are blocked at most firewalls by default, establishing an Internet-based phone call is impossible or at least hindered. This is a general problem, which the present invention tries to solve.

SUMMARY OF THE INVENTION

It is an object of the invention to provide a voice-over-IP telephony computer system which enables the system participants to built up Internet-based telephone communication channels initiated by clients not having available VoIP software on their computer, wherein specific firewall restrictions are bypassed.

This object is achieved by a VoIP telephony computer system comprising
a client computer with a web browser installed and which is connectable to a network with access to the public Internet,
a web server which can be reached over the public Internet from said client computer,
a gateway computer which can be reached over the public Internet from said client computer,
a VoIP private branch exchange device which can be reached from said gateway computer,
wherein the VoIP telephone computer system is adapted to run following steps of establishing and maintaining a VoIP telephone connection between the client computer on the one hand and the gateway computer and the VoIP PBX device on the other hand:

the client computer, using the web browser, downloads an applet type application, which is adapted to establish a VoIP telephone connection from said web server,
said downloaded applet type application establishes a tunnel connection to said gateway computer and installs a SIP-telephony client on said client computer, and
all VoIP telephone connection related data between the client computer and the gateway computer and vice versa are transferred using the tunnel connection.

According to the invention, Voice-over-IP (VoIP) is used from a browser-based client, i.e. a webphone. To avoid the problems that might exist with limited access to the public Internet because of firewall restrictions, a tunnel connection is built between the user's client computer and a specific gateway, which might be located in the user's corporate network. Using this connection, protocols which are usually used by VoIP and which are possibly blocked by a firewall, can be tunnelled to a location, wherefrom the associated VoIP PBX device can be reached.

Typical users of this invention are members of an organization who work from remote. These may be home-workers or sales people on the road, also called road-warrior. Other users of this application may be those who have just a PC or other device, which can access the public Internet and want to use this device instead of a traditional telephone.

BRIEF DESCRIPTION OF THE DRAWINGS

The invention will be described in more detail in the following explanation of preferred embodiments referring to the accompanying drawings, in which.

DETAILED DESCRIPTION OF THE PREFERRED EMBODIMENT

Figure 1:
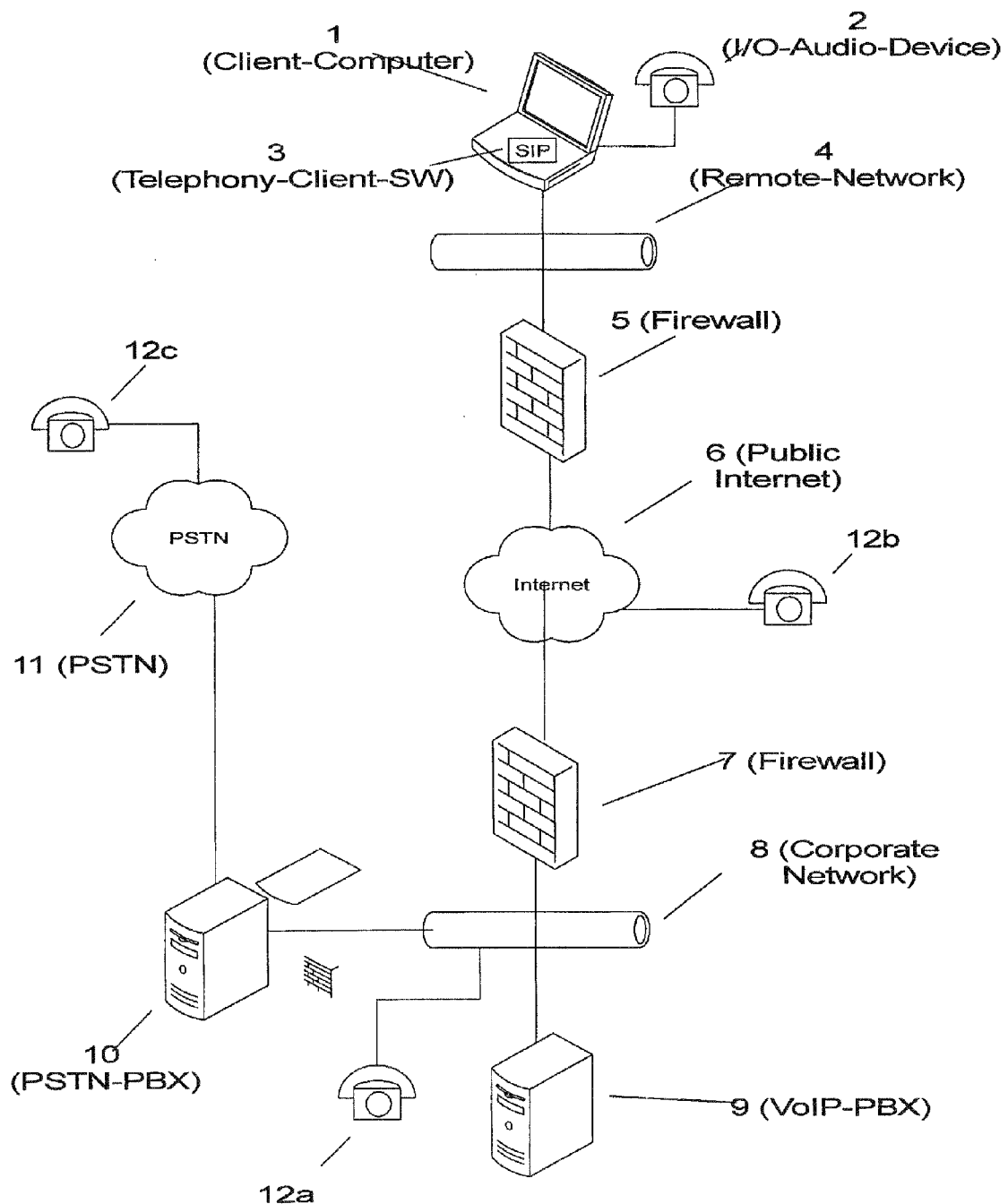
FIG. 1 is a schematic overview of a prior art VoIP telephony system.
Figure 2:
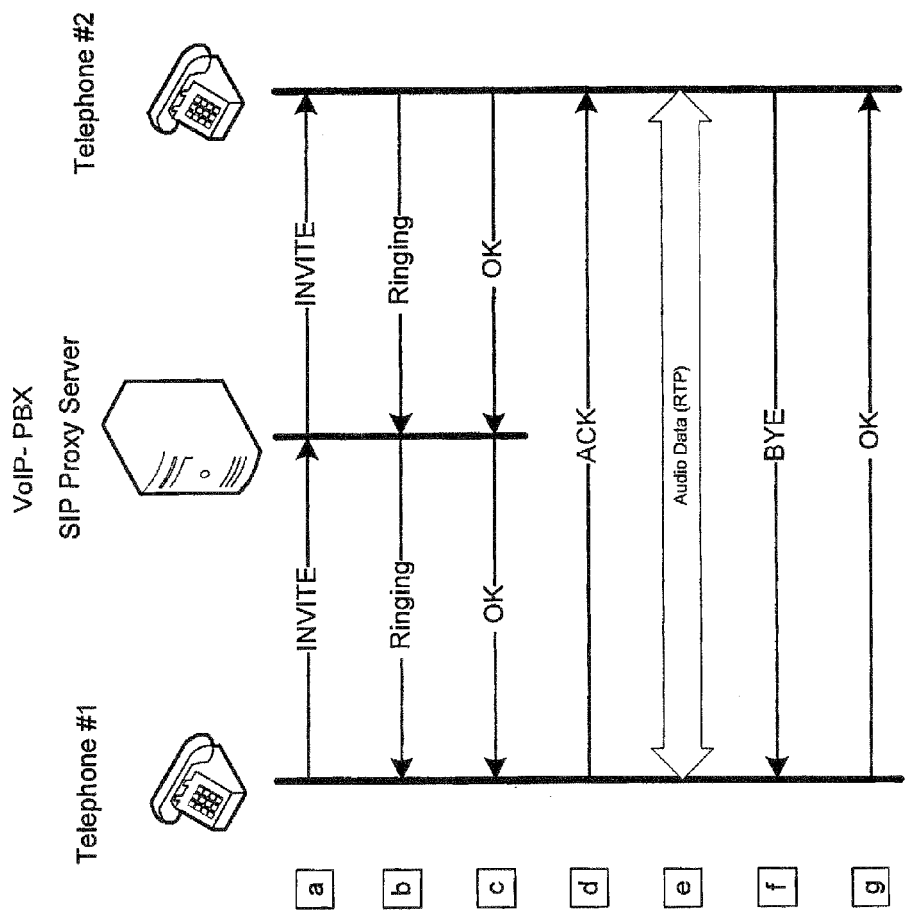
FIG. 2 is a diagram showing the steps of establishing a SIP-based connection for a VoIP phone call.

FIGS. 1 and 2 were already explained in the introducing part of this specification. The according information is not to be repeated at this point.

Figure 3:
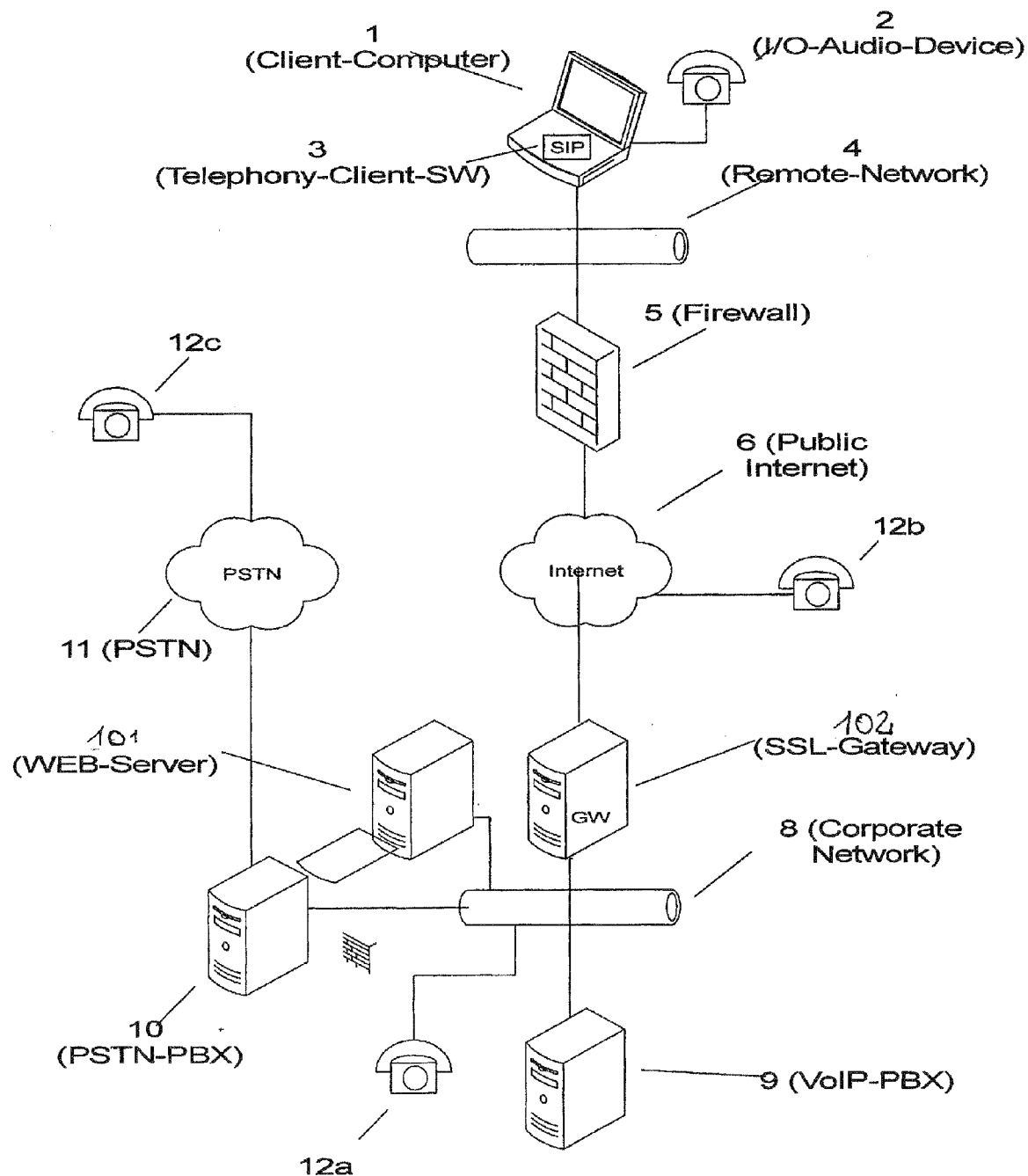
FIG. 3 is a schematic overview of a VoIP telephony system according to the invention.

Now referring to FIG. 3 the major functional components of the present invention are discussed. As most of the components are the same as already described in connection with the prior art referring to FIGS. 1 and 2 in the following only the differences and necessary additions compared to the prior art are explained.

First of all it is to be noted that for reasons of clarity the firewall between the corporate network 8 and the public Internet 7 is omitted in FIG. 3. That does not mean that the firewall does not exist. It is left out in this drawing since this firewall is only of minor relevance as regards to the present invention.

One additional component is a web-server 101 that provides a browser based executable application (Java Applet/ActiveX-Control) for the client computer 1. The second additional component is a gateway computer 102 that may be located in the user's corporate network but it could also be connected to any other location where unhindered access to the associated VoIP-PBX 9 is possible.

In a preferred embodiment of the present invention the web-server 101 and the gateway computer 102 are running on the same hardware device 110. This reduces the costs for hardware and simplifies administrative tasks.

Figure 4:
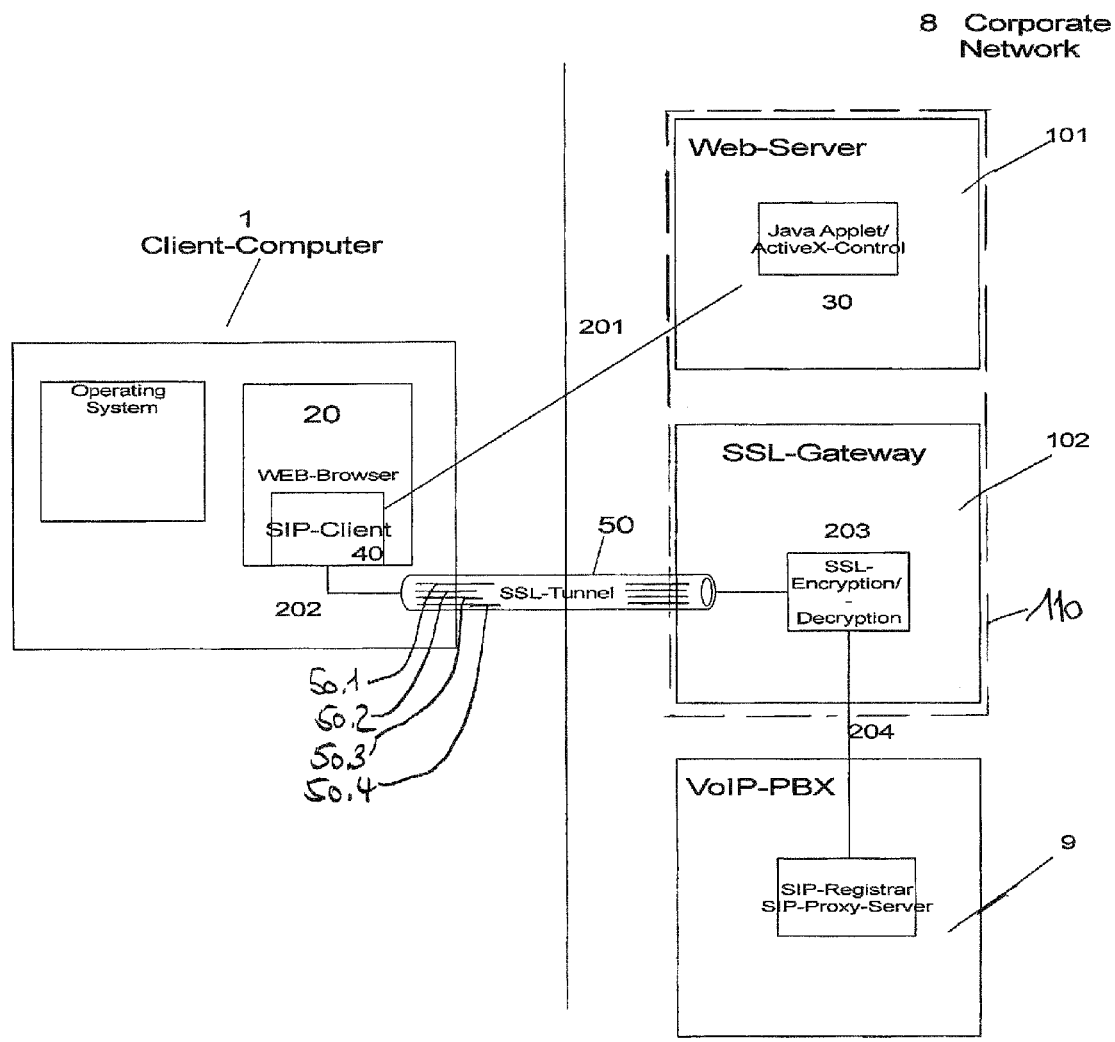
FIG. 4 is a more detailed diagram of a VoIP telephony system according to the invention.

The application shown in greater detail in FIG. 4 works as follows:

At the client computer 1 the user opens his web browser 20, navigates to a web server 101 which is preferentially located inside the corporate network 8. After successful authentication at this server the user is able to download 201 an applet type application like a Java® Applet or Active-X®-Control 30. The applet type application 30 contains a SIP telephony client 40 which will operate in the environment of the web-browser 20. It contains the according configuration parameters based on the user's authentication data. In doing so no local installation, configuration or administration rights are necessary on the client computer 1, the machine used by the user to connect to aforesaid web page.

Moreover the Java Applet/ActiveX-Control 30 has a further important function. It establishes a tunnel connection 50 between the user computer 1 and the gateway 102. The gateway 102 and the tunnel connection 50 are needed in cases where SIP, RTP and RTCP cannot be directly used via the public Internet because of firewall restrictions. The underlying problem has been discussed in the prior art description.

In this way the client's webphone can initiate a SIP-based VoIP phone call even in environments where the client computer would otherwise not be able to contact the VoIP-PBX device 9 directly. Roughly speaking the gateway is a sub-agent or sub-SIP-client that is placed in a location where unhindered access to the VoIP-PBX device 9 is possible.

Organizations that provide telephone functionality to their remote users often want to avoid unauthorized access to their PBX and in many cases they want to have additional security like encryption. Therefore in a preferred embodiment of the current invention SSL-encryption (HTTPS) is used to transport the VoIP/SIP protocols between the client and the gateway which gives an additional advantage as regards to security interests.

SSL (Secure Sockets Layer) is a cryptographic system that provides an encrypted data stream for secure communication on insecure networks. For this purpose SSL uses a public key infrastructure with public and private keys. The public key is known to everyone but the private key is only known to the recipient. In this way the sender can encrypt a data message by use of the recipient's public key and only the recipient who holds the private key is able to decrypt the message.

In a further embodiment of the present invention the VoIP-PBX device 9 connects directly to the internal network of the organization which also controls the web server 101 and the SSL-gateway computer 102. But in other embodiments it may also be possible that the VoIP-PBX device 9 may be under control of an external VoIP telephony provider. Anyway the SSL-gateway has to forward all signalling or audio data to the VoIP-PBX or to the VoIP end points.

In VoIP phone calls the real time audio data, which has to be exchanged between the two calling partners, is transmitted by the use of RTP, the Real-Time Transport Protocol, RFC 3550.

Due to the fact that SSL is based on the TCP transport protocol, SSL is not the best solution to transport audio data across the public Internet. TCP is a connection-oriented protocol that implements certain mechanisms to make sure that lost or corrupted packets will be resent from the sender to the receiver. The receiver detects a corrupted packet by checking the CRC checksum (Cyclic Redundancy Code) of every received packet. A lost packet will be detected if the sequence numbers of the received packets are not in the correct order. In such cases the receiver informs the sender about the problem and the sender has to retransmit the missing data. In any case this leads to an interruption of the current data stream and as a consequence of this an additional delay occurs and therefore the real time audio quality suffers.

In UDP-based data traffic bad packets are just discarded, which results in a better real-time audio quality compared to TCP. Therefore UDP is the preferred transport protocol for real-time audio data.

It is also important to know that in a phone call, the best audio quality is reached when audio packets are exchanged directly between the two endpoints of the phone call, not crossing a PBX or other gateway. Direct communication between the two telephone partners gives the smallest delay.

On the public Internet, protocols IPV4 and IPV6 are in use. It is one of the fundamentals of the Internet that each device connected to the Internet has its unique address. In the address ranges of IPV4 and IPV6, certain areas of addresses are reserved for private intranets (for IPv4 see RFC 1918 "Address Allocation for Private Internets"). When devices from such a private intranet are communicating via the public Internet, typically their private Internet address is translated by NAT (Network Address Translation) to a public Internet address. This NAT typically is done in firewalls or other proxies.

The present invention takes actions in respect to the issues described above in several ways.

Figure 5:
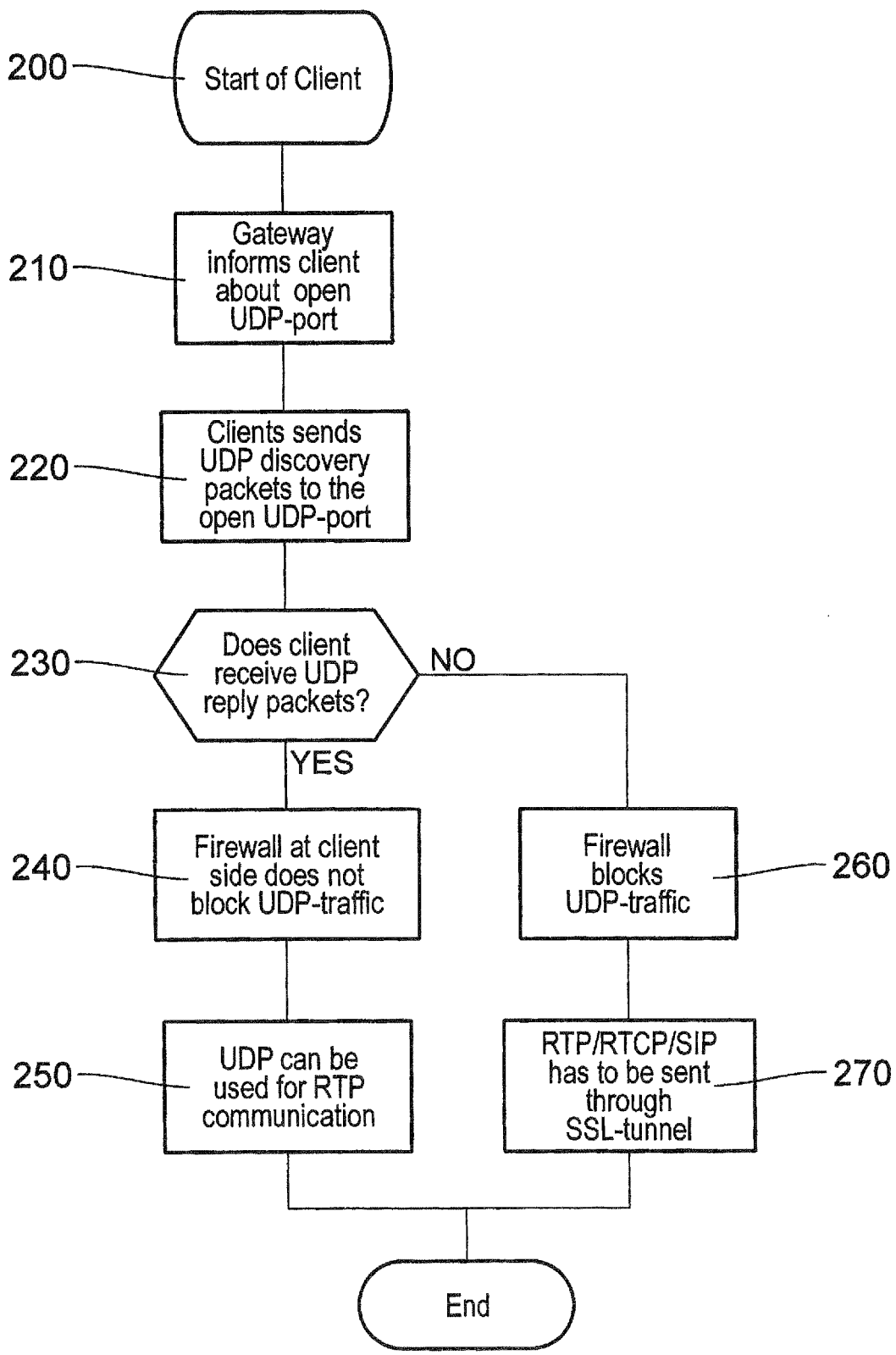
FIG. 5 is a flow diagram reflecting a so-called UDP discovery.

One aspect is a UDP discovery process, of which FIG. 5 is a visualization in the form of a flow chart:

First of all it has to be checked out if a firewall 5 blocks UDP traffic. For this reason the SSL gateway computer 102 opens an UDP port to the public Internet 6 and waits for receiving data on this port. The telephone client 40 of this invention, when started—step 200—gets information about this open UDP port of the SSL-gateway computer 102 over the SSL connection—step 210. Now the client sends one or preferred a small number of discovery UDP packets to this port (a single UDP packet could be lost)—step 220—and waits for reception of any reply packets—step 230. When the gateway receives one of these discovery UDP packets it just sends an acknowledge in form of a reply packet back to the client computer. When the client computer 1 receives this reply packet—answer 'yes' in step 230—, it knows that no firewall blocks the UDP traffic—step 240—and so later this information can be used to exchange real-time audio (RTP and RTPC) over this UDP port—step 250—.

If the client computer 1 does not receive any response to the discovery UDP packets for a certain time—answer 'no' in step 230—it knows that UDP traffic is blocked—step 260—. Therefore real-time audio has to be sent over the SSL connection as well—step 270.

Basically since the signalling data is not as sensitive as real time audio the SIP messages are always transmitted using the connection via SSL tunnel 50 ("SSL connection" in the following). The data stream over the SSL connection 50 uses sub-channels 50.1. 50.2, 50.3, 50.4 (see FIG. 4) to transport different types of data. A type-field makes sure that the types of data can be distinguished:

0—control information
1—SIP packets
2—RTP packets
3—RTCP packets

When a phone call is established using SIP signalling the UDP ports for real-time audio have to be negotiated. This is done using SDP (Session Description Protocol—see RFC 4566). The VoIP telephony system—shortly "telephone client" in the following—of this invention first checks if both partners of the telephone call are in the public Internet. This can be realized by checking the Internet addresses of both partners. If both partners are in the public Internet, the real-time audio can be exchanged directly, without crossing the SSL-gateway computer. In this way the best audio quality is achieved.

If one or both partners of the phone call have IP addresses, which are reserved for private networks, it is assumed that they are in different intranets and therefore no direct communication is possible. In those cases the real-time audio has to cross the gateway computer—shortly "gateway" in the following—of this invention. In such cases the telephone client sends a control message to said gateway and requests that in the SSL-gateway UDP ports for RTP and RTCP have to be opened. The gateway opens randomly chosen free UDP ports (sockets) and sends the port numbers and the IP address back to the telephone client.

Now the telephone client can include these port numbers in SIP/SDP packets to be exchanged with the partner of the telephone call.

Later, when real-time audio is exchanged over said gateway, either the open UDP port mentioned earlier (discovery packet) is used or the SSL connection is used on the sub-channels provided for RTP and RTCP. When the open UDP port is used, the packets get additional headers so that the gateway can identify which client the packets belong to, and the data is encrypted, for example through the use of SRTP, the Secure Real-time Transport Protocol (see RFC 3711).

The gateway has to exchange SIP packets with the PBX device. Most PBX devices support only UDP as carrier for SIP. Generally the SIP packets have to use UDP Port 5060 on both sides. This means, when multiple clients use SIP over said gateway, and the gateway receives a SIP UDP packet from the VoIP PBX device, the gateway has to find out to which phone client this SIP UDP packet belongs. When the gateway has determined which client a packet belongs, it will forward this SIP packet via SSL to the corresponding phone client, using SIP sub-channel 1.

Finding out which telephone client is the target of a received SIP UDP packet works as follows:

Each telephone client registers its SIP identification, a value corresponding to a telephone number, in the gateway. When a SIP packet is received by the gateway, the gateway first finds out if the packet is a request or a response.

If the first characters of the received SIP packet contain the constant "SIP/" this is a response, otherwise it is a request.

Values in SIP packets are preceded by a keyword, each pair of keyword and value is separated by carriage-return line-feed as in a HTTP header. So the gateway searches the received SIP packet for either the keyword "To" in a request or the keyword "From" in a response. When this is found, the SIP identification follows, preceded by the constant "<sip:".

Now the gateway searches for this value in its database of registered SIP identifications and in this way determines which telephone client this received SIP packet belong.

What is claimed is:

1. A Voice-over-IP-(VoIP-) telephony computer system comprising
    a client computer (1) with a web browser (20) installed and which is connectable to a network (4) with access to the public Internet (6),
    a web server (101) operatively connected to said client computer (1) to reach the web server (101) over the public Internet (6) from said client computer (1),
    a gateway computer (102) operatively connected to said client computer (1) to reach the gateway computer (102) over the public Internet (6) from said client computer (1),
    a VoIP private branch exchange (PBX) device (9) operatively connected to said gateway computer (102) to reach the VoIP PBX device (9) from said gateway computer (102),
    wherein the VoIP telephone computer system is configured to establish and maintain a VoIP telephone connection between the client -2- computer (1) on the one hand and the gateway computer (102) and the VoIP PBX device (9) on the other hand:
    an applet type application (30) stored on a non-transitory computer readable storage medium, downloaded using the web browser (20) to the client computer (1) and programmed to establish a VoIP telephone connection from said web server (101),
    wherein said downloaded applet type application (30) is programmed to establish a tunnel connection (50) from the client computer (1) to said gateway computer (102) and to install a Session Initiating Protocol telephony client (40) on said client computer (1),
    wherein the client computer (1) is configured to transfer all VoIP telephone connection related data between the client computer (1) and the gateway computer (102) and vice versa using the tunnel connection (50),
    wherein the VoIP telephone connection related data are transferred in a way that uses only one common TCP or UDP port for the connection and wherein the tunnel connection (50) between the client computer (1) and the gateway computer (102) is secured by use of an encryption,
    wherein the applet type application (30) first tests if UDP-traffic can be exchanged between the client computer (1) and the gateway computer (102) by sending and receiving UDP discovery packets to the gateway computer (102),
    wherein the tunnel connection (50) is used for transport of real-time audio data if no UDP reply packets are received by the client computer (1), and
    wherein in case the client computer (1) receives UDP reply packets from the gateway computer (102) the client computer (1) sends real-time audio data directly to a phone partner via a direct data connection bypassing the tunnel connection (50).

2. A VoIP telephony computer system according to claim 1, wherein the encryption securing the tunnel connection (50) between the client computer (1) and the gateway computer (102) is SSL encryption.

3. A VoIP telephony computer system according to claim 1, wherein the web server (101) and the gateway computer (102) are implemented on the same hardware device (110).

4. A VoIP telephony computer system according to claim 1, wherein the applet type application (30) on the client computer (1) checks if the phone partner has an IP-address that is reachable over the public Internet (6) by comparing the IP-address of the phone partner with a list of predefined IP-addresses used for private networks.

5. A VoIP telephony computer system according to claim 4, wherein real-time audio data are transferred directly to the phone partner in case the phone partner has a publicly reachable IP-address.

6. A VoIP telephony computer system according to claim 4, wherein real-time audio data are sent via the tunnel-connection (50) to the phone partner in case the phone partner has a private IP-address that is not reachable over the public Internet (6).

7. A VoIP telephony computer system according to claim 6, wherein the client computer (1) sends a control message to the gateway computer (102) in order to open UDP ports for RTP and RTCP type data transmission.

8. A VoIP telephony computer system according to claim 1, wherein the tunnel connection (50) uses sub-channels (50.1, 50.2, 50.3, 50.4) for control information, SIP packets, RTP packets and RTCP packets.

9. A VoIP telephony computer system according to claim 8, wherein a type-field is used to distinguish the different sub-channels (50.1, 50.2, 50.3, 50.4).

10. A VoIP telephony computer system according to claim 1, wherein the gateway computer (102) distinguishes different SIP sessions by searching for the SIP-identifier in SIP-packets received from the VoIP-PBX device (9) to get information to which client computer (1) said SIP-packets have to be sent.

* * * * *